July 6, 1948.   R. FELDT ET AL   2,444,560

CATHODE-RAY TUBE SPECTROGRAPH

Filed April 15, 1944

Rudolf Feldt
Carl Berkley   INVENTORS
BY
Charles W. Mortimer
ATTORNEY

Patented July 6, 1948

2,444,560

UNITED STATES PATENT OFFICE 2,444,560

CATHODE-RAY TUBE SPECTROGRAPH

Rudolf Feldt and Carl Berkley, New York, N. Y., assignors to Allen B. Du Mont Laboratories, Inc., Passaic, N. J., a corporation of Delaware Application April 15, 1944, Serial No. 531,273

7 Claims. (Cl. 88—14)

This invention relates to a color analyzer or spectrograph in which a cathode-ray tube oscillograph is used for producing a visible signal such that color values can be determined therefrom.

In carrying out the invention a suitable spectrum that is to be examined is produced, this spectrum is scanned priodically with the aid of a phototube and the currents thereby produced are amplified and caused to produce indications on the screen of a cathode-ray tube which enable the color values to be ascertained.

Figure 1:
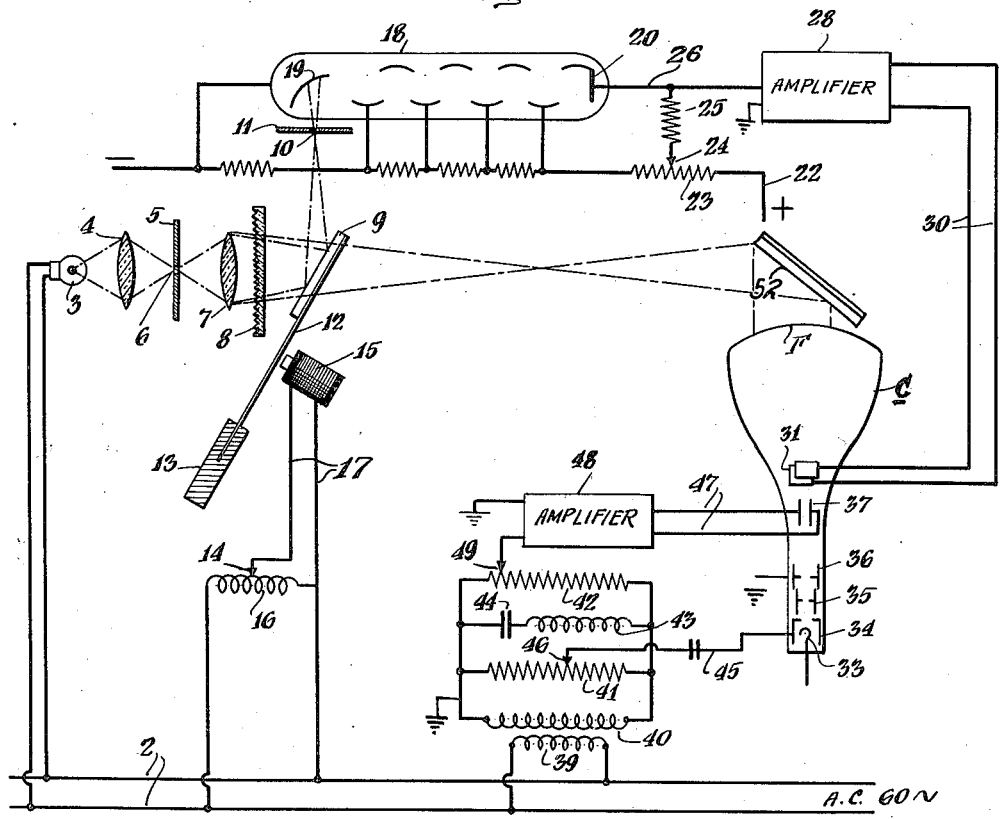
Figure 2:
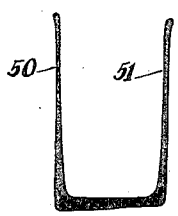
Figure 3:
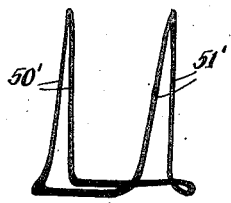
Figure 4:
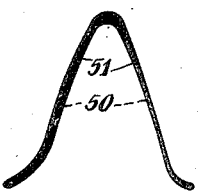

The invention may be understood from the description in connection with the accompanying drawing, in which:

Fig. 1 is a somewhat diagrammatic drawing indicating apparatus elements that may be used in carrying out the invention; and Figs. 2, 3 and 4 are diagrams of oscillograph signals obtained with this spectrograph.

The apparatus comprises a source of radiant energy such as visible light, for example, and a device for producing a spectrum of the radiant energy, a scanning device for scanning this spectrum, a photocell the response of which is proportional to the intensity of the wave lengths of the spectrum and an oscillograph having a cathode-ray tube upon the screen of which signals are produced that enable the observer to analyze the radiant energy with respect to its components of different wave lengths and the relative magnitudes thereof.

In the drawing, reference character 2 indicates leads from a source of alternating current which may be 60 cycles. A source of light 3, which may be an electric bulb, is connected to the leads 2. A condensing lens 4 is located in front of the bulb 3, and an opaque plate 5 is provided with a slit 6 and is located at the focal point of the lens 4 on the other side thereof from the light 3. An objective lens 7 is provided from which light passing therethrough from the slit 6 is passed through a diffraction grating 8 to a mirror 9. A prism or other dispersing means may be used instead of the grating 8 to resolve the light from source 3 into its spectrum. The light is reflected from the mirror 9 and passes through a slit 10 to a fixed opaque plate 11 located in such a position that light reflected from the mirror 9 passes through this slit 10, the color of the light passing through at any moment depending upon the position of the mirror 9.

The mirror 9 is securely attached to one end of a spring 12 which is made of magnetic material. The length of this spring is such that it is tuned to the frequency of the current in the leads 2. The other end of this spring is anchored in a fixed support 13. A magnet 15 that is energized from the leads 2 reciprocates the mirror 9 laterally. For this purpose an impedance 16 is connected across the line 2, and leads 17 extend from the magnet 15, the contactor 14 at the end of one of these leads being adjustable on impedance 16 to control the energy for reciprocating the spring 12 so that the amplitude of movement of the mirror 9 can be adjusted to move the image entirely across the slit 10 and no more, so that the scanning is continuous. In the mean position of the mirror the central portion of the scanned spectrum passes through the slit. Since the images are swept across the slot 10 twice per cycle the frequency is twice the frequency of the line 2.

An energy-responsive device such as an electron multiplier phototube 18, for example, is provided. The cathode 19 of this phototube is located in the path of light that passes through the slit 10. The anode of this phototube is indicated at 20.

A lead 22 extends from a source of positive potential to one end of resistor 23, the other end being connected to the negative side of said source. Contact 24 sliding on resistor 23 is connected through resistor 25 and lead 26 to the anode 20.

The anode 20 is coupled to an amplifier 28 which may consist of a plurality of stages when desired. The output from amplifier 28 is coupled by leads 30 to one pair of deflecting plates 31 of a cathode ray tube C in the known way.

The tube C is a conventional cathode-ray tube having a gun structure having a cathode 33, a control grid 34 and accelerating and focussing anodes 35 and 36. The horizontal deflecting plates of the tube C are indicated at 37.

The primary 39 of a transformer is connected to the leads 2, the secondary of this transformer being shown at 40. Resistors 41 and 42, and an inductance coil 43 and capacitor 44 in series are connected across the terminals of secondary 40.

The lead 45 connects control grid 34 by means of a sliding contact 46 to the resistor 41. Leads 47 connect the deflecting plates 37 to amplifier 48 which is connected by a lead and a sliding contact 49 to resistor 42. The resistor 42, inductance coil 43 and capacitor 44 constitute a phase shifter for the amplifier 48, this phase shifter being varied by means of the sliding contact 49.

The operation is as follows:

The source of radiant energy such as light to be investigated is located where the bulb 3 is shown. This light may be that from the bulb 3 itself or it may be reflected light from an object located there and illuminated in a suitable way.

The light passing through the lens system 4, 7 and slit 6 is spread out in different wave lengths on the reciprocating mirror 9 by the diffraction grating 8, from which mirror it is reflected. A prism may be used instead of this grating. The wave length of light passing through the slot 10 from mirror 9 at any moment depends on the instantaneous position of the reciprocating mirror 9 which in turn depends upon the phase of the current from line 2 in coil 15. The various wave lengths and intensities of light striking the cathode 19 cause variations of current to plate or anode 20 and corresponding variations of output from amplifier 28. Or the plate 11 may be reciprocated longitudinally for controlling the instants at which different wave lengths strike the cathode 19 in which case the mirror 9 is permitted to remain stationary.

These variations of output cause the potential on the vertical deflecting plates 31 to vary so that the vertical deflection of the cathode-ray spot on the face F of the tube C varies accordingly. Since the frequency of the deflecting impulses on horizontal deflecting plates 37 is the same as that of the current in coil 15, by means of which the mirror 9 is reciprocated, the horizontal and vertical deflecting impulses on the cathode-ray beam in the tube C are kept properly timed with respect to each other. The frequencies of these impulses are automatically synchronized since they depend upon the frequency that is applied to the leads 2. The phase of the impulses applied to deflection plates 37 may be shifted as desired by moving the sliding contact 49.

Due to the back and forth motion of the reciprocating mirror 9 two congruent images are produced on the screen. Although the same voltage is applied to the coil 15 for reciprocating mirror 9 and to the deflecting plates 37 an approximate 90° phase shift exists between the motion of the mirror and the horizontal position of the spot on the screen. Due to this phase shift the image may appear compressed at both ends of the cycle as shown at 50 and 51, Fig. 2. In order to avoid this the phase shifting network 42—44 centers the images on the screen and brings them to complete overlapping. Fig. 3 shows at 50' and 51' the result when the phase shift is partially compensated for. Fig. 4 shows the final result when the phase shift is completely compensated for. Fig. 4 represents the pattern when the phase has been shifted 90° from the position shown in Fig. 2.

If desired, one of the images may be made invisible by cutting off the beam at appropriate times. This is accomplished by the network 41, 45, which applies a negative pulse to the grid 34 in synchronism with one of the images by adjusting the contact 46.

Some of the advantages obtained by the present invention are:

(a) Since both the rate of motion of the spectrum image across the slit 10 and the rate of motion of the horizontal sweep of the cathode-ray tube C are harmonic a scale on the face F of this tube may be linear. When the mirror is in the mean position it travels at its highest velocity. When the mirror is at its extreme position it travels at its lowest velocity. The horizontal deflection of the cathode-ray tube spot has an exactly similar motion. When the slit traverses the spectral image at a slow rate, the cathode-ray tube spot also moves slowly. If a linearly-changing horizontal deflection were used on the cathode-ray tube the spacing of the various wave lengths would vary depending upon whether the slit was traversing the spectrum at a slow or a fast rate.

Since the vibrating spring 12 is tuned to resonance with the power line frequency its motion corresponds closely to a pure sine wave. Since it is a simple matter to obtain a correspondingly pure sine wave electrically for the horizontal deflection of the cathode spot of the tube C for example from power line 2, the synchronization of the horizontal and vertical deflections take place.

(b) The production of the spectrum is continuous since a portion of the spectrum image is constantly on the slit.

(c) The photocell signal consists of a fundamental frequency and a series of harmonics, the fundamental frequency being that of the mirror. When the amplitudes of these harmonics are high, with respect to the fundamental, a wide-band amplifier is required to reproduce them faithfully to attain accurate spectral measurement. When the amplitude of the harmonics is too low with respect to the fundamental, a low bandwidth inexpensive amplifier which does not reproduce the harmonics may be used without distorting the picture appreciably. When the signal is produced throughout the cycle a Fourier analysis will show the signal to be mostly a fundamental with low amplitude harmonics, but when the spectrum scanning takes place during only a small fraction of the cycle, a Fourier analysis will show that harmonics of higher amplitude exist. With a vibrating mirror scanning occurs throughout the cycle thus eliminating the higher harmonics and permitting the use of a simple amplifier. Practically the vibrating mirror results in the reduction of the harmonic frequencies by a factor of approximately 100. This is due to the fact that with the vibrating mirror a signal is produced throughout the cycle while with a rotating mirror the signal is produced during only $1/100$ of the cycle.

(d) It is easily possible to explore with the above described arrangement any particular part of the spectrum desired, either by increasing the gain of horizontal amplifier 48 or by limiting the vibration amplitude of the scanning means. This enables increased resolution of the curve traced on the face of the tube C to be attained.

If for example the photocell is deficient in red sensitivity, the current through the lamp may be adjusted in phase so that the maximum current occurs at the instant when the photocell is being illuminated by red light.

(e) It is easily possible to explore any particular part of the spectrum by changing the mean position of the scanned part of the spectrum with repect to the scanning slit 10. This can be done by moving the slit 10 to another part of the spectrum or by changing the average angle of the mirror. For some purposes it is desirable to use the visible part of the spectrum. For other purposes, it is desirable to use the ultra-violet or infra-red portion.

(f) A portion of the dispersed light may be projected by means of mirror 52 as a spectrum on the face of the cathode-ray tube to serve as a visual indication of the color values. The size of this spectrum may be adjusted so as to serve as a wave-length scale. To do this it is only necessary that the scanning mirror 9 does not intercept all the light from the dispersing means but permits some light to be passed on to the mirror 50, thence to the face of the cathode-ray tube C.

The device may be operated with direct instead of alternating current when desired by using well known means such as circuit make and break devices for vibrating the mirror and generating the sweeps.

It is obvious that the inherent non-linearity may be controlled so as to compensate for non-linearity in the wave-length distribution of either the optical system or the scanning means when desired.

A mirror 50 may be located in such a position with respect to the face of the cathode-ray tube C as to project a color spectrum from the grating 8 on to the face of the tube C to serve as a wave length scale for the light.

What is claimed is:

1. In a device of the character described, a source of alternating current power, means to produce a beam of light, means to produce a spectrum from said beam, means comprising a reciprocating mirror resonantly mounted with respect to said source of power and an electromagnet energized by said source to reciprocate said mirror in resonance with said power to scan said spectrum, and means comprising a phototube and an oscillograph to utilize light from successive portions of said spectrum and produce a signal thereby.

2. The device of claim 1 in which means are provided to vary the amplitude of vibration of said mirror to explore portions of said spectrum with increased resolution.

3. In a device of the character described means to cause light from a source to produce a color spectrum, a resonantly mounted reciprocating mirror to scan a portion of said spectrum, a cathode-ray tube, means to cause the beam of said tube to be deflected in synchronism with said mirror, and means comprising another mirror for projecting another portion of said spectrum on the face of said tube to serve as a wave length scale for light produced by said beam.

4. A spectrograph comprising means to produce a spectrum, a reciprocable mirror upon which said spectrum is projected, means comprising a magnet and a source of alternating current for reciprocating said mirror to cause scanning of said spectrum, a plate having a slit so located that only a portion of said spectrum can be projected through said slit from said mirror at one time, the phototube upon which different portions of said spectrum impinge in succession as said portions are reflected by said mirror and pass through said slit resulting in a current signal, a cathode-ray tube having two pairs of deflection plates to display said signal, an amplifier to apply signals from said phototube to one of said pairs of plates, and leads to apply alternating currents of the same frequency as said source to said other pair of plates.

5. A spectrograph comprising means to produce a spectrum, a reciprocable mirror upon which said spectrum is projected, means comprising a magnet and a source of alternating current for reciprocating said mirror, a plate having a slit so located that only a portion of said spectrum can be projected through said slit from said mirror at one time, a phototube upon which different portions of said spectrum impinge in succession as said portions are reflected by said mirror and pass through said slit resulting in a current signal, a cathode-ray tube having two pairs of deflection plates to display said signal, leads to apply signals from said phototube to one of said pairs of plates, leads to apply alternating current of the same frequency as said source to said other pair of plates and means comprising a non-linear sweep to cause the scale of said spectrum to be linear.

6. In combination, a source of alternating current power, a cathode-ray tube connected to said source of power and adapted to display a spectral distribution signal, means for producing a beam of light, means to produce a spectrum from said beam, means to scan said spectrum continuously and produce said signal, said means comprising a tuned resonantly mounted reciprocating mirror in resonance with said source of power and an electromagnet to reciprocate said mirror, whereby reciprocating of said mirror causes it to reflect and scan said spectrum and produce a spectral distribution curve on said cathode-ray tube.

7. A cathode-ray tube spectrograph comprising means to produce a spectrum, a tuned resonantly mounted reciprocable mirror upon which said spectrum is projected, means comprising a magnet and a source of alternating current for reciprocating said mirror to cause scanning of said spectrum, a plate having a slit by which different portions of said spectrum can be selected as said mirror is reciprocated, a phototube located so as to produce a signal from the scanning of said spectrum when said portions of said spectrum are projected through said slit onto said phototube, a cathode-ray tube having deflection means adapted to display said photocell signal as a spectrogram on the face of said cathode-ray tube in a horizontal direction, said deflecting means being energized by said source of alternating current directly and being synchronized with it.

RUDOLF FELDT.
CARL BERKLEY.

REFERENCES CITED

The following references are of record in the file of this patent:

UNITED STATES PATENTS

| Number | Name | Date |
| --- | --- | --- |
| 18,005 | Darrah | Mar. 24, 1931 |
| 2,193,606 | Ulrey | Mar. 12, 1940 |
| 2,339,754 | Brace | Jan. 25, 1944 |